Nov. 5, 1968    J. W. MENDENHALL    3,408,885
TOOL SUPPORT

Filed April 7, 1966    2 Sheets-Sheet 1

INVENTOR.
JESSE W. MENDENHALL
BY
*John H. Midney*
ATTORNEY.

INVENTOR.
JESSE W. MENDENHALL
BY John H. Midney
ATTORNEY.

3,408,885
Patented Nov. 5, 1968

1

3,408,885
TOOL SUPPORT
Jesse W. Mendenhall, Fairfield, Conn., assignor to The
Bullard Company, Bridgeport, Conn., a corporation of
Connecticut
Filed Apr. 7, 1966, Ser. No. 540,891
15 Claims. (Cl. 82—36)

ABSTRACT OF THE DISCLOSURE

A tool support for a metal turning machine tool in which cutting tools for cutting either to the right or to the left of the center of rotation of a workpiece can be interchangeably mounted. The support has a recess symmetrically formed with respect to a reference plane of the support in which the shank of a cutting tool can be accurately positioned on either side of the plane of reference with the cutting tip positioned in each case on the reference plane. A locking wedge for holding the cutting tool shank in the recess can be attached to the tool support on either side of the plane of reference depending upon the type of cutting tool being employed.

---

The present invention relates to machine tools, and more particularly to an improved tool support adapted to mount a variety of cutting tool types with the cutting edges thereof lying on a predetermined plane relative to the tool support.

The present invention has applicability to various machine tools of the type having a single direction of spindle rotation in which a workpiece is held in a chuck or fixture mounted on the spindle while various turning, facing and boring operations are performed on the workpiece. In accomplishing each of these types of machining operations, it is necessary in order to achieve proper cutting action to position the cutting edge of the tool substantially on a line passing through the center of the rotating workpiece. For this reason, it has been the practice to provide each particular cutting tool type with angularly intersecting reference surfaces at predetermined locations relative to the cutting edge. A tool support for mounting each particular tool type is provided with corresponding reference surfaces such that when the reference surfaces of the tool are held in abutting engagement with the reference surfaces of the tool support, the cutting edge is located along a predetermined line relative to the tool support, which line passes through the machine spindle centerline when the tool support is mounted on the machine.

The tool supports heretofore available have not been adapted to accommodate the different tools used for various machining operations, such as for boring, turning or facing operations either on the right or on the left of the center of rotation of the workpiece. Each tool support was generally provided with a recess or cavity for mounting a particular tool type with the cutting edge positioned for proper cutting action. However, the location of the recess or cavity in a tool support, including the tool support reference surfaces, which would properly position a turning tool for a cut right-of-center would not properly position the cutting edge of, for example, a boring tool for making a cut left-of-center. Accordingly, it has been heretofore necessary to provide each machine with a number of lefthand and righthand tool supports for accommodating the various types of tools which may be used. It will be apparent that the additional tool supports required increase the overall cost of the machine tool, and also provision must be made for storage of the extra tool supports when not in use.

Moreover, with the increased use of automatically controlled machine tools in industry in which a series of machining operations is performed in accordance with a predetermined program, one well known form of control being the numerical tape control, it is highly desirable to minimize the nonproductive time required to change tooling setups for performing a different machining operation. One method of achieving this result is by the use of preset tooling in which tools having adjustable reference surfaces are precisely adjusted away from the machine to predetermined dimensions between the cutting edge and the reference surfaces thereof so that when mounted in their corresponding tool supports, the cutting edges will be positioned in a predetermined location. A tooling change can then be quickly made and the machine is ready to continue productive operation with no need for any major tooling adjustments.

Heretofore in making tooling changes to perform a new sequence of operations, it has often been necessary to replace the tool supports to accommodate the particular tools for performing the new set of machining operations. However, to further minimize the time required to make such tooling changes, it would be highly desirable to provide tool supports capable of mounting the different tools for performing the various machining operations, for example, left or righthand turning, boring or facing cuts, and to be able to readily remove and replace the various tools in the tool support.

Accordingly, an object of the present invention is to provide an improved tool support which will overcome the problems and disadvantages hereinbefore pointed out.

Another object is to provide such a tool support which is capable of holding a variety of tool types for making cuts on the righthand or on the lefthand sides of center of a rotating workpiece.

Another object is to provide such a tool support which will position the cutting edge of a tool mounted therein in a predetermined location relative to the support.

Another object is to provide such a tool support which reliably and firmly holds a tool with the cutting edge thereof in the desired location.

A further object is to provide such a tool support in which the tools can be readily and quickly removed and mounted.

Yet a further object is to provide such a tool support wherein a tool retention member can be positively disengaged from the tool retaining position.

The above objects are accomplished by the present invention by providing a tool support with a tool mounting recess including two opposed locating surfaces symmetrically positioned relative to a fixed plane of reference of the tool support, and a third locating surface extending normal to the plane of reference and intersecting the opposed locating surfaces at the same predetermined angle. A cutting tool for use with the tool support has a shank with two locating surfaces which intersect each other at the aforementioned predetermined angle and a cutting edge precisely positioned with respect to the tool locating surfaces. The tool shank is positioned in the tool support recess with its locating surfaces in contact with one of the opposed locating surfaces and the third locating surface. A retaining wedge is also positioned in the recess and attached by screws to the support. The retaining wedge has a surface in contact with the other of the opposed locating surfaces of the recess and forcibly bears against the tool shank to retain it in the tool support. The dimensions of the tool support recess are such that the cutting edge of a tool mounted in the recess will be positioned on the tool support plane of reference. Depending on the particular type of tool, i.e., the type of cutting operation to be accomplished and the location on a rotating workpiece in which the cutting is to take place, the shank may be positioned on one side or the other of the tool support plane of reference, and the retaining wedge correspondingly attached to the tool support on either side of the plane of reference as may be appropriate so that the cutting edge of the tool will in every case be located substantially on the plane of reference.

The tool support has provision for being mounted in a precise location on a machine tool in which a workpiece to be machined is held in a fixed position on a rotating table with the plane of reference passing through the center of rotation of the workpiece. The proper cutting action may thus be achieved with the same tool support irrespective of the type of cutting tool being used for the particular machining operation.

Numerous other objects and advantages of the invention will be apparent as it is better understood from the following description which, taken in connection with the accompanying drawings, discloses a preferred embodiment thereof.

Referring to the drawings.

The preferred or exemplary embodiment of the present invention is hereinafter described as applied to a vertical turret lathe. It is to be understood, however, that the principles of the present invention may be advantageously employed with other types of machine tools.

Figure 1:
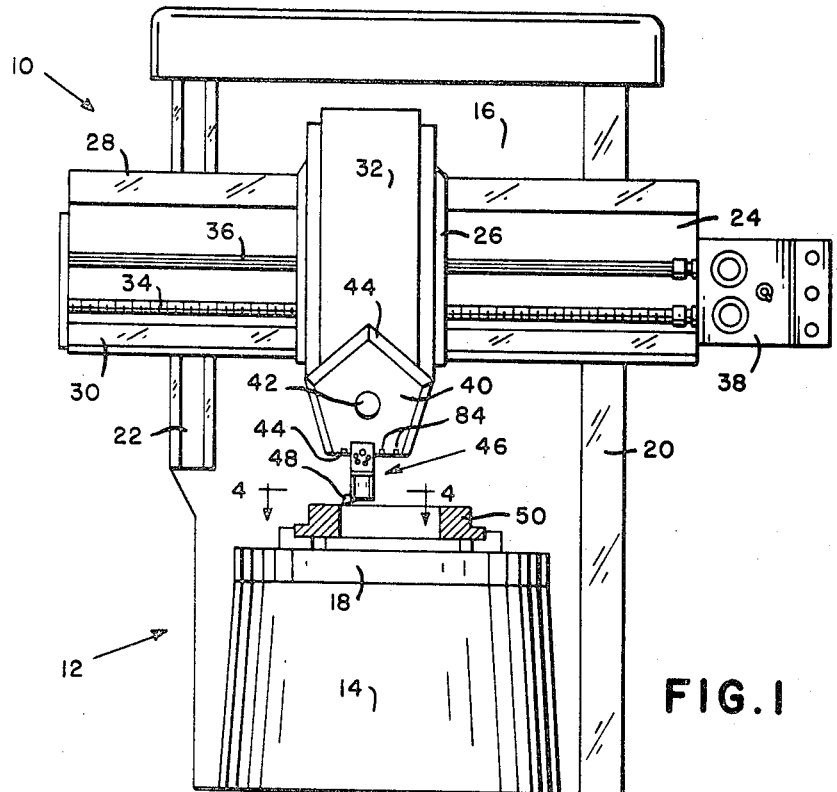
FIG. 1 is a front elevational view of a vertical turret lathe having a tool support embodying features of the present invention.

Referring to FIG. 1, there is shown a vertical turret lathe, generally designated 10, having a base casting 12 including a barrel 14 and a column 16. The barrel 14 supports a table 18 which is rotated by a headstock transmission (not shown) in a manner well known in the art. The column 16 has ways 20 and 22 with a cross rail 24 slidably mounted thereon for vertical movement. A saddle 26 is mounted on ways 28 and 30 on the cross rail 24 for horizontal movement therealong. A vertically movable slide 32 is mounted between ways on the saddle 26. A screw 34 and splined shaft 36 rotatably driven by a feedworks transmission 38 respectively move the saddle 26 and slide 32 along their paths of travel. A multisided turret 40, mounted on a pin 42 extending from the slide 32, is capable of being indexed so that each face 44 thereof can be sequentially positioned in a horizontal plane moving a tool support 46 mounting a tool 48 into position to perform a working operation on a workpiece 50 supported on table 18 as the latter rotates, all in a manner well known in the art.

Figures 2, 3:
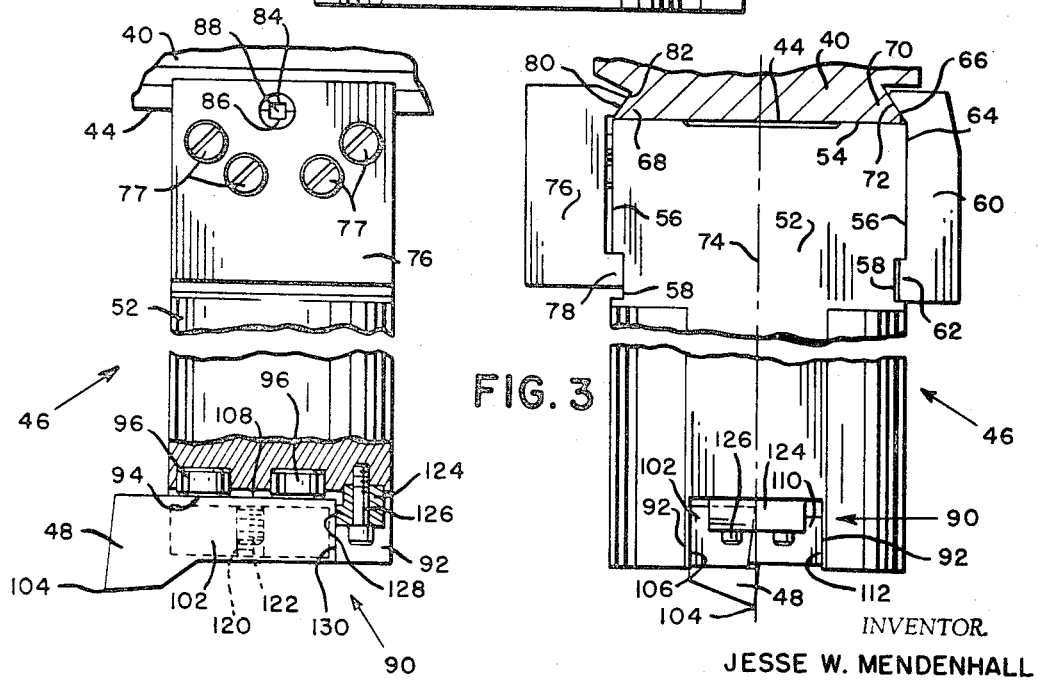
FIG. 2 is an enlarged front elevational view of the tool and tool support mounted on the turret of the machine of FIG. 1, with the tool support shown partially in section.
FIG. 3 is an enlarged side elevational view of the tool and tool support of FIG. 1.

Referring to FIGS. 2 and 3, the faces 44 of the turret 40 are accurately machined so that they present surfaces which are identically located from the centerline of pin 42, which is the center of rotation of the turret. The tool support 46 has a body member 52 with an accurately machined surface 54 adapted to be held in contact with a face 44 of the turret 40 to accurately position the tool support relative to the turret in the vertical direction, as shown in FIG. 1.

The body member 52 also has accurately machined flat surfaces 56 and rectangular grooves 58 in symmetrical, parallel relation, located at both the front and rear of the body member adjacent the surface 54. A locating block 60 has a tongue portion 62 precisely fitting within the rearwardly positioned groove 58, and a surface 64 held in intimate contact with the adjacent surface 56 of the body member 52 by cap screws (not shown) which extend through clearance holes in the locating block into aligned, tapped holes in the body member. As so mounted on the body member 52, the locating block 60 has a surface 66 which cooperates with the surface 54 of the body member to form a precisely positioned and shaped locating groove.

The turret 40 is provided with dovetails 68 and 70 respectively extending along the front and rear of the turret adjacent each face 44. The rearwardly positioned dovetail 70 has a surface 72 precisely located on the turret such that with the dovetail 70 positioned within the locating groove and the surface 54 of the body member 52 and surface 66 of the locating block 60 in intimate contact with the face 44 and surface 72, respectively, of the turret 40, a plane of reference of the body member indicated by the dashed line 74 which is parallel to and equally spaced from the surfaces 56 of the body member will be coincident with a vertically and horizontally extending plane passing through the center of rotation of the table 18.

A clamp block 76 is attached to the front of the body member by cap screws 77 extending through clearance holes in the clamp block into aligned, tapped holes in the body member. The clamp block 76 has a tongue portion 78 which engages under the upper edge of the forwardly positioned groove 58 of the body member 52, and an inwardly and upwardly inclined surface 80 which bears against a correspondingly inclined upper surface 82 of the dovetail 68. A clearance space is provided between the forwardly positioned surface 56 of the body member 52 and the adjacent surface of the clamp block 76. Consequently, as the cap screws 77 are tightened, the surface 80 of the clamp block 76 tends to slide upwardly on the adjacent surface 82 of the dovetail 68, thereby drawing the surface 54 of the body member 52 upwardly into intimate contact with the face 44 of the turret 40. Also, the clamp block 76 pulls the body member 52 forwardly to bring the surface 66 of the locating block 60 into intimate contact with the surface 72 of the dovetail 70, thereby accurately positioning the body member with respect to the turret 40 in the axial direction, i.e., the direction normal to the plane of movement of the slide 32.

Preferably, the positioning of the tapped holes on each surface 56 of the body member 52 by means of which the locating and clamp blocks are attached thereto is identical so that either of the surfaces 56 can be positioned against the surface 64 of the locating block 60, and the body member can thus be secured to the turret 40 in either of two positions, spaced 180° from one another. In each case, however, the plane of reference 74 of the tool support 46 is identically positioned in the axial direction relative to the turret 40, and passes through the center of rotation of the table 18.

The turret 40 has keyways 84 precisely located on each side of the center of the faces 44. The body member 52 also has a keyway 86 on the surface 54 which, when held in alignment with a turret keyway 84 by a key 88, accurately positions the tool support 46 on the turret face 44 relative to the vertical centerline of the pin 42.

Figure 5:
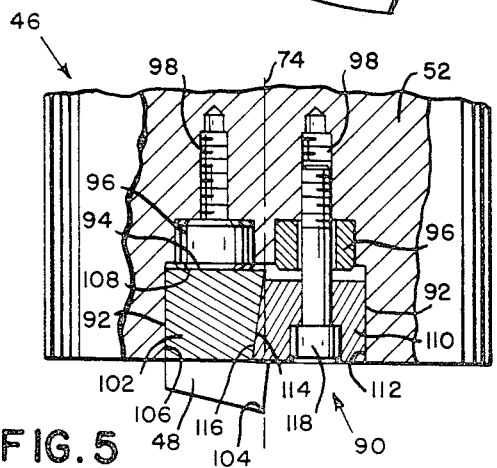
FIG. 5 is an enlarged sectional view taken substantially along the line 5—5 of FIG. 4.
Figure 7:
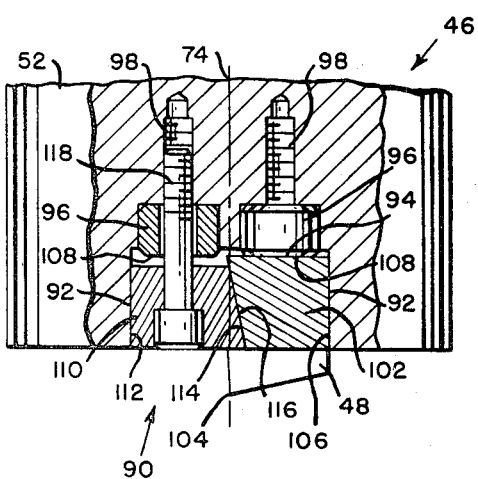
FIG. 7 is an enlarged sectional view taken substantially along the line 7—7 of FIG. 6.

Adjacent the end of body member 52 opposite the surface 54 there is provided a tool holding recess 90 having opposed locating surfaces 92 symmetrically positioned with relation to, and equally spaced from, the plane of reference 74. The recess 90 also has a locating surface 94 extending normal to the plane of reference 74 and formed by the surfaces of cylindrical buttons 96 press-fitted into the body member 52 on each side of the plane of reference. Preferably, but not necessarily, the opposed locating surfaces 92 are parallel to the plane of reference 74 and each intersects the plane coincident with the locating surface 94 at a right angle. The buttons 96 have clearance holes extending therethrough in alignment with tapped holes 98 in the body member 52 (FIGS. 5 and 7). The tapped holes 98 are symmetrically positioned with relation to, and equally spaced from, the plane of reference 74.

A cutting tool 48 has a shank 102 and a cutting tip 104, the shank having angularly intersecting locating surfaces 106 and 108 defining an included angle equal to the angle between the opposed locating surfaces 92 and locating surface 94 of the recess 90. The shank 102 is positioned in the recess 90 with the locating surface 106 in contact with one or the other of the opposed locating surfaces 92 and the locating surface 108 in contact with the locating surface 94 defined by the surfaces of the buttons 96. The location of the cutting tip 104 relative to the locating surface 106 is such that with the shank 102 so positioned in the tool holding recess 90, the cutting tip is positioned substantially on the plane of reference 74 of the tool support.

The cutting tool shank 102 is held in the recess 90 by a locking wedge 110 having a surface 112 abutting one of the opposed locating surfaces 92 of the recess 90 and an inclined surface 114 slidably abutting a correspondingly inclined surface 116 on the tool shank. Cap screws 118, extending through the wedge 110 and buttons 96 into the tapped holes 98, draw the wedge into the recess when tightened to exert a force on the surface 116 of the shank 102 which presses the locating surfaces 106 and 108 of the shank into intimate contact with the locating surfaces 92 and 94, respectively, of the tool holding recess.

To facilitate removal of the locking wedge 110 from the recess 90 for replacement of a tool 48, the wedge may be provided with a tapped hole 120 extending therethrough and a set screw 122. Upon loosening of the cap screws 118, the set screw 122 may be rotated to move it in the direction of the body member 52, and upon engaging the body member, an outward force is exerted on the wedge as the set screw is further rotated, thereby forcing the wedge from the recess 90.

The tool support 46 may also include an end block 124 having a portion closely fitting within a slot in the body member 52 and attached to the body member by cap screws 126 so as to securely position the block in the recess 90. The end block 124 has a locating surface 128 which is precisely spaced from the center of the keyway 86 as measured in the direction of movement of the saddle 26. Moreover, the locating surface 94 of the recess 90 defined by the exposed surfaces of the buttons 96 may be precisely spaced from the surface 54 of the body member 52. All of the locating surfaces 92, 94 and 128 of the tool support 46 may thus be precisely located, the surfaces 94 and 128 relative to the center of rotation of the turret 40, and the surfaces 92 relative to the center of rotation of the table 18. The cutting tip 104 of each tool 48 may also be precisely located with respect to the locating surface 108 and an end surface 130, as well as from the locating surface 106 as previously described. Thus, when the cutting tool 48 is mounted in the tool support 46, the cutting tip 104 will be at a predetermined location relative to the axis of rotation of the turret 40 and center of rotation of the table 18, whereby setup of the machine to accomplish particular programmed machining operations and replacement of worn tools can be readily and quickly carried out without the need for major adjustment of the tools.

Figure 4:
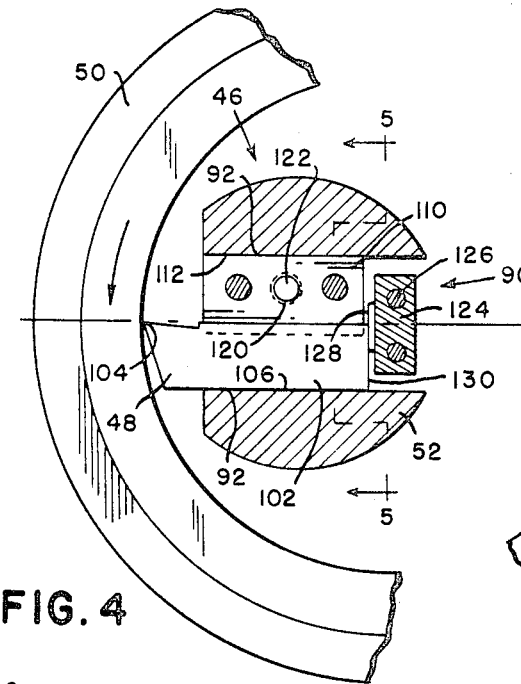
FIG. 4 is an enlarged sectional view taken substantially along the line 4—4 of FIG. 1.
Figure 6:
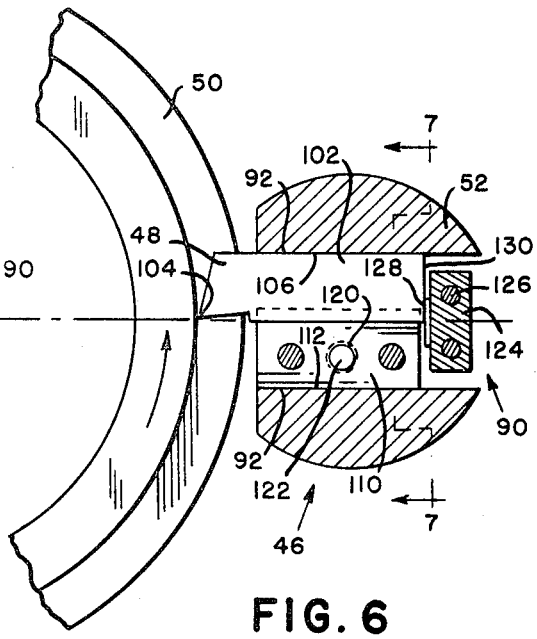
FIG. 6 is a view similar to FIG. 4, showing another tool type mounted in the tool support.

The versatility of the tool support of the present invention is shown in FIGS. 4–7. In FIGS. 4 and 5, the tool support 46 is shown with a tool 48 mounted therein for accomplishing a boring cut left of center. The locating surface 106 is positioned against the lowermost locating surface 92 of the recess 90, as shown in FIG. 4. A different sequence of machining operations may require a turning cut to be performed on the right of center, in which case a tool 48 for accomplishing such an operation may be mounted in the tool support 46 with the locating surface 106 now positioned against the opposite locating surface 92 of the recess 90, the position of the locking wedge 110 also being reversed (FIGS. 6 and 7). It will be readily apparent to those skilled in the art that the body member 52 may be remounted on the turret 40 in the 180° reverse position, whereby the same tool support is capable of holding appropriate tools for performing a boring cut right of center or a turning cut left of center. In every case, the tool support 46 of the present invention will position the cutting tip of the tool on the plane of reference 74, whereby the cutting tip will always be in contact with the workpiece along a line passing through its center of rotation, thereby achieving the proper cutting action.

Figure 8:
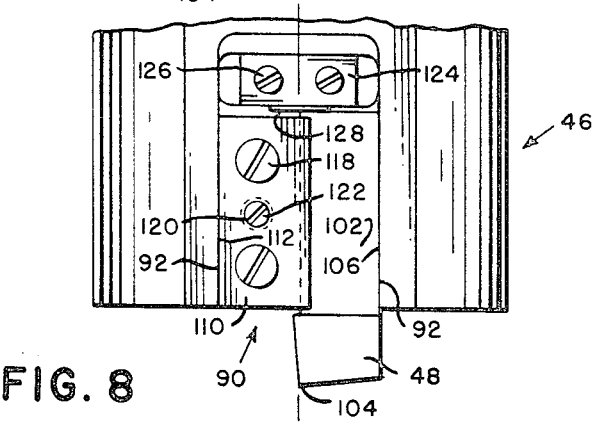
FIG. 8 is a side elevational view similar to FIG. 3, showing a modified tool support with the tool mounted vertically.

In the modified form of the invention shown in FIG. 8, the recess 90 is positioned on the side of the body member 52, and the shank 102 is positioned vertically. In all other respects, the construction of the tool support is identical to that previously described.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

What is claimed is:

1. A cutting tool support adapted to be mounted on a movable member of a metal turning machine tool, comprising a support block having a plane of reference; a recess in said support block symmetrically formed relative to said plane of reference and adapted to receive therein on either side of said plane of reference a shank of a cutting tool having first and second angularly disposed flat locating surfaces, the cutting tool having a cutting tip edge precisely located relative to said first and second shank locating surfaces; said recess having opposed locating surfaces symmetrically disposed on each side of said plane of reference and a third locating surface having portions angularly disposed to each of said opposed locating surfaces at substantially the same angle as the angular relation of said first and second shank locating surfaces; a wedge disposed in said recess having a surface in abutting engagement with one of said opposed locating surfaces; bolt means for selectively attaching said wedge to said block on either side of said plane of reference and forcibly urging said wedge into said recess; and a surface on said wedge adapted to abut against a cutting tool shank disposed in said recess on the other side of said plane of reference and to press the angularly disposed first and second locating surfaces thereon into abutting engagement with the other of said opposed and said third locating surfaces of said recess, respectively, the position of said opposed locating surfaces and said third locating surface relative to said plane of reference being such that said cutting tip edge is located substantially on said plane of reference when said shank is disposed on either side of said plane of reference.

2. The tool support set forth in claim 1 wherein said first and second shank locating surfaces are disposed at a right angle.

3. The tool support set forth in claim 1 additionally including means for attaching an end of said block to a head of a machine tool in first and second positions displaced 180° from one another with said plane of reference disposed in substantially the same predetermined location relative to said head.

4. The tool support set forth in claim 3 wherein said means comprises a surface of said block adapted to be held in abutting engagement with a surface of said head; and clamps fastened to said block in opposed locations symmetrically disposed relative to said plane of reference, said clamps being keyed to said block and having tapered surfaces adapted to cooperatively engage tapered surfaces on said head to exert a force on said block in the direction of said head, said clamps having locating surfaces forcibly engaging locating surfaces on said block in the direction perpendicular to said plane of reference to accurately position said plane of reference relative to said head, said end of said support block adapted to be attached to said machine tool head being symmetrical relative to said plane of reference.

5. The tool support set forth in claim 1 additionally including a fourth locating surface in said recess disposed at right angles to said two opposed and third locating surfaces thereof with said cutting tool shank having an end surface adapted to abuttingly engage said fourth locating surface and to accurately position said cutting tip edge therefrom.

6. The tool support set forth in claim 1 wherein said wedge surface adapted to abut against said shank comprises a flat surface angularly inclined relative to said plane of reference adapted to abut a correspondingly inclined flat surface on a cutting tool shank disposed in said recess to exert a force thereon having components normal to the locating surfaces of said shank and to urge said shank locating surfaces into abutting engagement with the adjacent locating surfaces of said recess.

7. The tool support set forth in claim 1 additionally including release means for moving said wedge from said recess, said release means comprising a screw threadably engaging said wedge and having a rotational axis disposed substantially perpendicular to said third locating surface, said screw having an end which abuts a surface of said recess and urges said wedge outwardly from said recess when said screw is rotated and moved in the direction of said third locating surface.

8. A cutting tool assembly for a metal turning machine tool, comprising a support block symmetrically formed relative to a plane of reference of said block; a cutting tool fixedly mounted in said block, said cutting tool having a shank with first and second locating surfaces disposed at a predetermined angle and a cutting tip located predetermined distances from said first and second locating surfaces as measured along lines through said tip and perpendicular to planes coincident with said first and second locating surfaces, said block having a recess including opposed locating surfaces symmetrically disposed on each side of said plane of reference and a third locating surface disposed normal to said plane of reference and at said predetermined angle relative to each of said opposed locating surfaces, said shank being disposed in said recess on either side of said plane of reference with said first and second locating surfaces thereof in abutting engagement with one of said opposed locating surfaces and said third locating surface of said recess, respectively, said opposed locating surfaces being disposed relative to said plane of reference to position said cutting tip substantially on said plane of reference when said shank locating surfaces are in abutting engagement with the respective recess locating surfaces; locking means attachable to said block on either side of said plane of reference for locking said shank in said recess while maintaining said shank first and second locating surfaces in abutting engagement with said one of said opposed and said third locating surfaces of said recess, respectively; and means for attaching said block to a machine tool member with said plane of reference disposed in a predetermined location relative to said member.

9. The cutting tool assembly set forth in claim 8 wherein said predetermined angle is a right angle.

10. The cutting tool assembly set forth in claim 8 wherein said opposed locating surfaces are parallel to and equally spaced from said plane of reference, and wherein said predetermined distance between said first locating surface of said shank and said cutting tip is substantially equal to the spacing between said opposed locating surfaces and said plane of reference.

11. The cutting tool assembly set forth in claim 10 wherein said locking means comprises a wedge-shaped member having one surface in abutting engagement with the other of said opposed locating surfaces and a flat surface opposite said one surface inclined inwardly of said recess and in the direction of said other of said opposed locating surfaces, said shank having a similarly disposed surface in abutting engagement with said inclined surface of said wedge member, at least one bolt extending through said wedge member; and means in said block for threadably engaging said bolt to secure said wedge member to said block.

12. The cutting tool assembly set forth in claim 11 wherein said block includes means for threadably engaging said bolt disposed on each side of said plane of reference, whereby said wedge member can be secured to said block on either side of said plane of reference.

13. The cutting tool assembly set forth in claim 11 additionally including release means for moving said wedge member outwardly from said recess when said bolt is retracted from said block, said release means comprising a screw threadably engaging said wedge member and having an end which abuts a surface of said recess to urge said wedge member outwardly when said screw is rotated and moved in the direction of said recess surface.

14. The cutting tool assembly set forth in claim 8 additionally including means defining a fourth locating surface in said recess, said fourth locating surface being disposed at right angles to said two opposed and third locating surfaces, said cutting tool shank having an end surface spaced a predetermined distance from said cutting tip and in abutting engagement with said fourth locating surface to position said cutting tip said predetermined distance therefrom.

15. The cutting tool assembly set forth in claim 8 wherein said support block comprises a separate member removably attached to an indexable turret head mounted on said machine tool member, said support block having an end portion which is symmetrically shaped with respect to said plane of reference, said attaching means including means for attaching said end portion of said block to said head in first and second positions displaced 180° from one another with said plane of reference disposed in substantially the same predetermined location relative to said head.

References Cited
UNITED STATES PATENTS

| | | | |
|---|---|---|---|
| 2,368,736 | 2/1945 | Wyrick | 82—36 |
| 3,239,911 | 3/1966 | Williams | 29—105 XR |
| 3,320,655 | 5/1967 | Schweitzer et al. | 29—105 |

LEONIDAS VLACHOS, *Primary Examiner.*